United States Patent
Gärtner et al.

(10) Patent No.: US 8,783,032 B2
(45) Date of Patent: Jul. 22, 2014

(54) METHOD FOR RECOVERING HEAT LOSSES OF AN INTERNAL COMBUSTION ENGINE

(75) Inventors: Jan Gärtner, Sindelfingen (DE); Thomas Koch, Böblingen (DE); Jozsef Marton Mercz, Schwäbisch Gmünd (DE); Jozsef Mercz, legal representative, Schwäbisch Gmünd (DE); Piroska Merczne, legal representative, Schwäbisch Gmünd (DE); Andreas Zygan, Malsch (DE)

(73) Assignee: Daimler AG, Stuttgart (DE)

( * ) Notice: Subject to any disclaimer, the term of this patent is extended or adjusted under 35 U.S.C. 154(b) by 381 days.

(21) Appl. No.: 12/802,798

(22) Filed: Jun. 14, 2010

(65) Prior Publication Data
US 2011/0056202 A1    Mar. 10, 2011

Related U.S. Application Data

(63) Continuation-in-part of application No. PCT/EP2008/009490, filed on Nov. 11, 2008.

(30) Foreign Application Priority Data

Dec. 22, 2007   (DE) .......................... 10 2007 062 580

(51) Int. Cl.
*F02G 3/00*   (2006.01)
(52) U.S. Cl.
USPC .................. 60/614; 60/615; 60/616; 60/618; 60/660; 60/670
(58) Field of Classification Search
USPC ............................. 60/614–618, 670, 660, 667
See application file for complete search history.

(56) References Cited

U.S. PATENT DOCUMENTS

| | | | |
|---|---|---|---|
| 4,426,842 A | * | 1/1984 | Collet ........................ 60/39.511 |
| 6,751,959 B1 | * | 6/2004 | McClanahan et al. .......... 60/670 |

(Continued)

FOREIGN PATENT DOCUMENTS

| | | |
|---|---|---|
| EP | 1 333 157 | 8/2003 |
| EP | 1 443 183 | 8/2004 |

(Continued)

OTHER PUBLICATIONS

Moran, Michael J. and Howard N. Shapiro, Fundamentals of Engineering Thermodynamics. 5th ed. New Jersey: John Wiley & Sons, 2004. p. 357.*

(Continued)

*Primary Examiner* — Thai Ba Trieu
*Assistant Examiner* — Ngoc T Nguyen
(74) *Attorney, Agent, or Firm* — Klaus J. Bach

(57) ABSTRACT

In a method for recovering energy from the heat dissipated by an internal combustion engine and to an internal combustion engine wherein the pressure and temperature of a liquid working medium are increased from a lower process pressure and a first temperature to an upper process pressure at which the working fluid is heated to a second temperature whereby it is converted to a gaseous phase; the working medium is then expanded back to the lower process pressure whereby mechanical power is generated and the working medium is converted back to a liquid phase, the upper process pressure being adjusted in such a way that the working medium is expanded into the wet steam area close to the saturated steam limit.

10 Claims, 1 Drawing Sheet

(56) References Cited

U.S. PATENT DOCUMENTS

| | | | |
|---|---|---|---|
| 6,928,820 B2 * | 8/2005 | Inaba et al. | 60/618 |
| 7,159,400 B2 * | 1/2007 | Tsutsui et al. | 60/665 |
| 7,454,912 B2 * | 11/2008 | Yamanaka et al. | 60/618 |
| 7,950,230 B2 * | 5/2011 | Nishikawa et al. | 60/618 |
| 2005/0013274 A1 | 1/2005 | Pekonen et al. | |
| 2007/0245737 A1 * | 10/2007 | Inaba et al. | 60/670 |
| 2010/0205959 A1 * | 8/2010 | Kasuya et al. | 60/618 |
| 2010/0307155 A1 * | 12/2010 | Kasuya et al. | 60/666 |
| 2011/0056203 A1 * | 3/2011 | Gartner et al. | 60/670 |
| 2011/0308252 A1 * | 12/2011 | Kopecek et al. | 60/653 |
| 2012/0073294 A1 * | 3/2012 | Enokijima et al. | 60/660 |
| 2012/0240575 A1 * | 9/2012 | Mori et al. | 60/616 |

FOREIGN PATENT DOCUMENTS

| | | | | |
|---|---|---|---|---|
| JP | 2002 115505 | | 4/2002 | |
| JP | 2003 278598 | | 10/2003 | |
| JP | 2004 060462 | | 2/2004 | |
| JP | 2005273543 A | * | 10/2005 | F01K 23/10 |
| JP | 2006 316704 | | 11/2006 | |
| JP | 2007 006684 | | 1/2007 | |
| JP | 2007006684 A | * | 1/2007 | |
| JP | 2008038916 A | * | 2/2008 | |

OTHER PUBLICATIONS

M. J Moran and H. N. Shapiro, Fundamentals of Engineering Thermodynamics, 2004, Wiley, 5 Ed., p. 362-363.*

R. A. Chaplin, Thermal Power Plants, 2009, EOLSS, vol. 3, Steam Turbine Operational Aspects.*

Machine translation of JP 2007-006684 A (published Jan. 11, 2007) obtained from www.epo.org on Jun. 4, 2013 (see attached).*

T. Endo et al., "Study on Maximizing Exergy in Automotive Engines", SAE International, Detroit Michigan, Apr. 2007.

* cited by examiner

METHOD FOR RECOVERING HEAT LOSSES OF AN INTERNAL COMBUSTION ENGINE

This is a continuation-in-part application of pending international patent application PCT/EP2008/009490 filed Nov. 11, 2008 and claiming the priority of German patent application 10 2007 062 580.6 filed Dec. 22, 2007.

BACKGROUND OF THE INVENTION

The invention relates to a method for recovering heat dissipated by an internal combustion engine, in which a working medium is first compressed in a compressor, subsequently evaporated in a heat exchanger by heat transfer from a heat medium containing heat dissipated by the internal combustion engine. Then the vapors are expanded in an expansion device, while mechanical power is recuperated in the expansion device, and subsequently the expanded vapor is condensed in a condenser. The invention further relates to a device for carrying out the method.

Present-day internal combustion engines have a degree of efficiency of up to 40 percent. The losses are thereby mainly passed on to a coolant and to the exhaust gas of the internal combustion engine as waste heat.

In the state of the art different methods and devices exist, by means of which mechanical and/or electrical energy can be obtained from an exhaust gas heat and/or a coolant heat of an internal combustion engine.

EP 1 443 183 A1 discloses a heat recovery device based on a Clausius-Rankine cycle process, with which energy can be obtained from an exhaust gas heat of an internal combustion engine. The heat recovery device comprises a delivery unit, a heat exchanger, an expansion device and a condenser, which are interconnected in a circuit and in which a working medium can be circulated. Further, means are provided with which a temperature of the working medium behind the heat exchanger can be adjusted in dependence on, a temperature of the working medium in front of the heat exchanger and on a mass flow of the working medium. The device further comprises means for adjusting a pressure of the working medium prior to the entry into the expansion device in dependence on the temperature of the working medium behind the heat exchanger.

T. Endo, S. Kawajiri, Y. Kojima, u. a. (Honda R&D Co., Ltd.): Study on Maximizing Exergy in Automotive Engines; in SAE TECHNICAL PAPER SERIES 2007-01-0257; 2007 World Congress, Detroit Mich., Apr. 16-19, 2007 discloses a heat recovery device, which can also be operated according to the Clausius-Rankine principle. The device comprises a delivery unit, a heat exchanger, an expansion device and a condenser, which are interconnected in a cycle and are flown through by a working medium. The device further contains a regulation unit, with the help of which a temperature of the working medium behind the heat exchanger can be regulated to a fixed target value. A speed of the delivery unit or a mass flow of the working medium through the heat exchanger thereby serves as a variable. Furthermore, a pressure of the working medium in front of the expansion device can be regulated to a fixed target value by means of a further regulation unit, wherein a speed of the expansion device is provided as variable.

It is the object of the present invention to provide a method for recovering heat dissipated by an internal combustion engine, with an optimum degree of efficiency during various operating conditions of the internal combustion engine. It is also an object of the present invention to provide an internal combustion engine with a heat recovery device for carrying out the method.

SUMMARY OF THE INVENTION

In the method for recovering heat dissipated by an internal combustion engine according to the present invention, an upper process pressure is adjusted in an operating region of the internal combustion engine in such a manner that the working medium is expanded at least approximately to a saturated steam limit in an expansion device. A saturated steam limit is characterized in that the working medium is "still" in the gaseous phase; a low enthalpy reduction (for example in the form of a temperature reduction with constant pressure) would lead to a phase transition of a part of the working medium from a gaseous phase to a liquid phase. It is ensured by the method that the working medium in the expansion device is respectively expanded from an upper process pressure which is as high as possible to a lower process pressure which is as low as possible under different operating conditions. The method is further distinguished in that a comparatively large part of the energy contained in the working medium can be converted to mechanical power with different operating conditions, and only a small part is discharged in the condenser as cooling heat, so that altogether an improved degree of efficiency results. A further advantage of the method consists in an improved operating safety, as only little condensation of the working medium is provided for in the expansion device under different or all operating conditions. The danger of damage to the expansion device due to an excessive condensation of the working medium is thereby reduced.

In one arrangement of the invention, the upper process pressure is adjusted by adapting a delivery performance of the delivery unit in an operating region of the internal combustion engine. It is thereby possible in a simple manner to influence a mass flow of the working medium by the heat exchanger and thus a ratio between the upper process pressure and the lower process pressure.

In a further arrangement of the method, in a particular operating region of the internal combustion engine the working medium is expanded in the expansion device to a wet steam area. It is thereby possible, with an approximately constant maximum process pressure of the working medium (after flowing through the heat exchanger), to increase the upper process pressure further by means of the delivery unit and to improve a degree of efficiency of the method further in this manner. The expansion of the working medium in the expansion device thereby preferably takes place only slightly above the saturated steam limit, in order to avoid damages at the expansion device by excessive condensation of the working medium.

In a further arrangement of the invention, a lower process pressure is adjusted in an operating region of the internal combustion engine within a presettable pressure region. It is possible in this manner to adjust the lower process pressure and the upper process pressure independently of each other. The lower process pressure can in particular be adapted to an optimum operating region of the condenser. The lower process pressure can for example be adjusted in such a manner that the condenser is operated with a largely constant condensation pressure, for which it is designed. The lower process pressure can in particular also be kept constant to a large extent even with a change of the upper process pressure.

In a further arrangement of the method, a mass flow of the working medium is regulated and/or controlled by means of the expansion device. Thereby, in addition to the adaptation of the delivery performance of the delivery unit, is given a further possibility to influence a mass flow of the working medium and connected therewith the upper process pressure. It is furthermore possible by means of the expansion device and the delivery unit to adjust the lower process pressure and the upper process pressure independently of each other.

In a further arrangement of the invention, a mass flow of the working medium is adjusted by regulating and/or controlling a performance of the expansion device. This can for example take place by a variation of the load of the expansion device.

With an internal combustion engine with a heat recovery device according to the invention, means are provided for regulating the upper process pressure in dependence on an operating state of the internal combustion engine. The upper process pressure can thereby in particular be adjusted in such a manner that the working medium in the expansion device is expanded at least approximately to a saturated steam limit. In this manner, an operation that is optimal with regard to the degree of efficiency is ensured with different operating conditions.

In one arrangement of the invention, the upper process pressure can be adjusted in dependence on a nominal value for the lower process pressure and in dependence on a third temperature of the working medium downstream of the heat exchanger. The upper process pressure can for example be deposited as a characteristic field in a control device or can be calculated by a mathematic and/or empiric model from the mentioned process variables. The upper process pressure is preferably fixed in such a manner that the working medium in the expansion device is expanded at least approximately to a saturated steam limit.

In a further arrangement of the invention, the means for regulating the upper process pressure comprise a first control unit and sensors for sensing an operating state of the internal combustion engine, in particular sensors for sensing a load state of the internal combustion engine.

In a further arrangement of the invention a mass flow of the working medium can be adjusted by means of the delivery unit in dependence on measuring variables of the sensors for sensing the operating state. It is thereby possible in a simple manner to adapt the upper process pressure to an operating state of the internal combustion engine by means of the delivery unit.

In further arrangements of the invention a temperature sensor is provided for sensing the third temperature of the working medium downstream of the heat exchanger. A further sensor can additionally be designed as a pressure sensor for sensing the upper process pressure and be arranged downstream of the heat exchanger. Measuring variables are thereby available, which enable a fixing of the upper process pressure which is optimal with regard to the degree of efficiency, In a further arrangement of the invention, means are provided for regulating the lower process pressure in dependence on an operating state of the internal combustion engine. It is thereby possible to adjust the upper process pressure and the lower process pressure independently of each other, whereby a further improvement of the degree of efficiency results in a large operating region of the internal combustion engine.

In a further arrangement of the invention, the means for regulating the lower process pressure a second control unit, by means of which a load of the expansion device can be adjusted. The first control unit and the second control unit can thereby also be combined to a common unit. By means of a variation of the load, a mass flow of the working medium can be influenced in particular. A lower process pressure can also in particular be adjusted in this manner.

In a further arrangement of the invention, the lower process pressure can be adjusted according to a nominal specification by the means for regulating the lower process pressure. The nominal specification can in particular be chosen in such a manner that the working medium is supplied to the condenser under a defined pressure.

In further arrangements of the invention, the expansion device is designed as a turbine and/or as a piston expansion machine and coupled to a generator and/or an electric motor and/or a motor/generator unit. The mechanical power that can be taken from the expansion device can thereby be used directly for supporting the internal combustion engine or can be converted to electrical energy via the generator.

In a further arrangement of the invention, a load of the expansion device can be adjusted by means of the generator and/or the electric motor and/or the motor/generator unit. A mass flow of the working medium through the expansion device can thereby also be influenced easily.

In summary, the method for recovering heat dissipated according to the invention and the internal combustion engine with a heat recovery device according to the invention make an improved operation of the Clausius-Rankine cycle process over a large working region possible. In addition to an optimum performance by means of an increase of the total degree of efficiency, a reduction of the cooling heat to be discharged to an environment is further achieved. By the low additional material and production effort, the method according to the invention and the internal combustion engine according to the invention can be realized in a simple and cost-efficient manner.

The invention will become more readily apparent from the following description of particular embodiments with reference to the accompanying drawings.

DESCRIPTION OF THE PROCESS ACCORDING TO THE INVENTION

Figure 2:
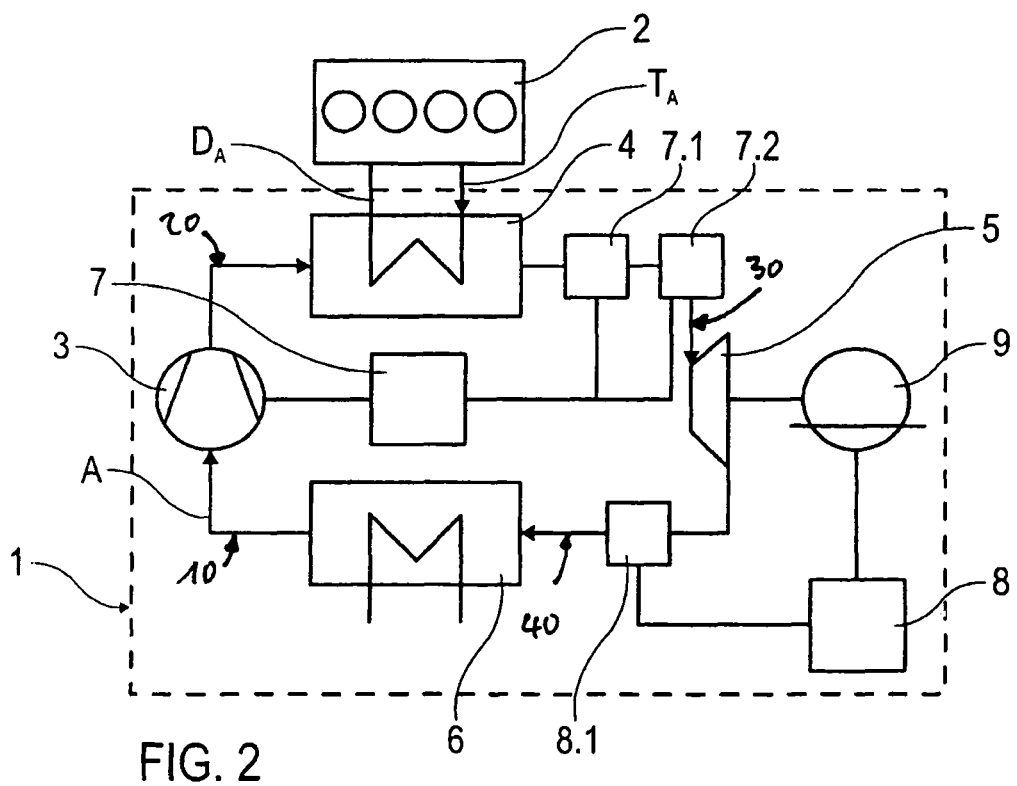

First, an internal combustion engine 2 with a heat recovery device 1 according to the invention is described with reference to FIG. 2.

In the heat recovery device 1, a delivery unit in the form of a pump 3, a heat exchanger 4, an expansion device in the form of a turbine 5 and a condenser 6 are interconnected in a closed circuit. A working medium A in the form of water can be circulated in the circuit in the direction indicated by the arrows. The heat recovery device is suitable for carrying out a so-called Clausius-Rankine cycle process. In a modified embodiment, an organic medium, for example ethanol or n-butane can also be used as working medium The working medium A is present in a liquid phase prior to the entry into the pump 3. It has a first, comparably low temperature $T_1$, which preferably is between 60° and 90° C. The pressure that the working medium has prior to the entry into the pump 3 corresponds to the lower process pressure $p_u$ and is typically between one and two bar. In the pump 3, the liquid working medium can be compressed to an upper process pressure $p_o$, for example 90 bar, in an approximately adiabatic and isentropic manner. After the compression, the working medium has a second temperature $T_2$, which at least approximately corresponds to the first temperature $T_1$, or exceeds this (depending on the used working medium and operating state) between 0.1 K and 10 K.

Subsequently, the working medium A is conducted through the heat exchanger 4. In the heat exchanger 4, a heat transfer from an exhaust gas of the internal combustion engine 2 to the working medium A can takes place. The heat transfer thereby takes place in a largely isobar manner. When flowing through the heat exchanger 4, the working medium A is first heated to a boiling temperature $T_S$ in the liquid phase in a largely isobar manner and is then vaporized in an isobar and isotherm manner. The gaseous part of the first working medium A continuously increases during the vaporization, until the working medium A is completely present in the gaseous phase. Subsequently, the gaseous working medium is largely superheated in an isobar manner to a third temperature $T_3$, which is preferably between 400° and 500°.

After flowing through the heat exchanger 4, the gaseous working medium A can be guided to the turbine 5, in which it can be essentially expanded in an adiabatic manner at least approximately to the lower process pressure $p_u$. A mechanical power can thereby be taken from the turbine 5 at a shaft. The working medium is cooled to a fourth temperature $T_4$ during the expansion. Some low condensation of the working medium A may occur in the turbine 5.

The turbine 5 is coupled to a motor/generator unit 9, in which the mechanical power that can be taken from the turbine 5 can be converted into electrical energy, which can again be stored in an electrical store, not shown.
Subsequently, the working medium A can be guided to a condenser 6, in which heat is transferred from the working medium to a cooling medium. The working medium can thereby be converted from a gaseous phase into a liquid phase (condensation) when flowing through the condenser 6. Subsequently, the working medium can be supplied to the pump 3, so that a cycle is closed.

In a particular embodiment, the condenser 6 is coupled to a cooling circuit of the internal combustion engine, so that the cooling of the working medium A can be realized by a heat transfer from the working medium A to a coolant of the internal combustion engine.

The heat recovery device 1 further comprises a first control unit 7, a temperature sensor 7.1 for sensing a third temperature $T_3$ of the working medium A behind the heat exchanger 4 and a first pressure sensor 7.2 for sensing an upper process pressure $p_o$. The first control unit 7 is connected to the pump 3 via a line. A delivery performance of the pump 3 in dependence on the measuring variables of the temperature sensor 7.1 and/or the first pressure sensor 7.2 can be adjusted by the control unit 7. In this manner, a mass flow of the working medium A through the pump 3 and a pressure ratio between the upper process pressure $p_o$ and the lower process pressure $p_u$, can be influenced in dependence on the mentioned measuring variables. In a modified embodiment, not shown, further measuring variables of the internal combustion engine and/or of the heat recovery device are provided as input variables for the first control unit 7 for determining a nominal delivery performance of the pump 3. Conceivable measuring variables are for example a speed of the internal combustion engine, an exhaust gas temperature $T_a$ and an exhaust gas mass flow $D_a$.

With the help of a second control unit 8 and a second pressure sensor 8.1 for sensing a lower process pressure $p_u$ behind the turbine 5, a load of the generator can be adjusted in dependence on the lower process pressure $p_u$. A mass flow of the working medium A through the turbine 5 can be influenced in this manner. In addition to the adjustment of the delivery performance of the pump 3, a second variable is given thereby, in order to influence a pressure ratio between the upper process pressure $p_o$ and the lower process pressure $p_u$ and also the absolute values of the two process pressures. In a modified embodiment, not shown, further measuring variables of the internal combustion engine and/or of the heat recovery device are provided as input variables for the second control unit 8 for determining a load of the motor/generator unit 9. Conceivable measuring variables are for example a speed of the internal combustion engine, an exhaust gas temperature and an exhaust gas mass flow.

In a further modified embodiment, the first control unit and the second control unit are combined to a single control unit. Thereby, in particular nominal values for the load of the motor/generator and the delivery performance of the pump can be fixed in dependence on the measuring variables of the first temperature sensor, the first pressure sensor and the second pressure sensor and possibly further sensors.

The cycle process that can be carried out with the help of the internal combustion engine according to the invention for recovering a dissipated heat is described in the following by means of FIG. 1.

Figure 1:
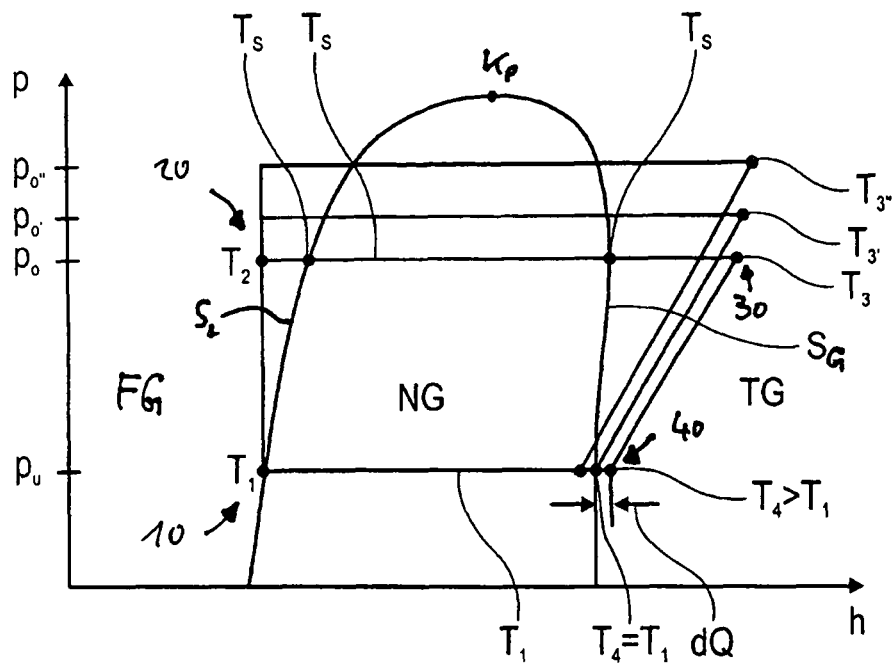
FIG. 1 shows pressure enthalpy diagrams of three Clausius-Rankine cycle processes based on different upper process pressures and FIG. 2 shows schematically a circuit diagram of an internal combustion engine with a heat recovery device according to the invention.

In FIG. 1, a pressure enthalpy diagram of the working medium is shown schematically. In the diagram is shown a boundary line $S_L$, $S_G$, by which the regions are limited, in which the working medium is present in different phases. The boundary line can be divided into a boiling curve $S_L$ and a saturated steam limit $S_G$, which merge at a critical point K. The boiling curve $S_L$ and the saturated steam limit $S_G$ together delimit a so-called wet steam region NG, in which the working medium is present in a liquid phase and also in a gaseous phase. With an enthalpy reduction (for example by a temperature reduction at a constant pressure) to under the boiling curve $S_L$, the working medium has converted completely to the liquid phase; the region of the pressure enthalpy diagram, which is limited by the ordinate and the boiling curve, is thus also called fluid region FG. An enthalpy increase to over the saturated steam limit $S_G$ however leads to a complete phase change into the gaseous phase, and the corresponding region of the pressure enthalpy diagram is called a so-called dry steam region.

Furthermore, a cycle process for recovering a dissipated heat in an idealized form is shown in FIG. 1 without friction or heat losses.

Prior to the entry into the pump 3, the working medium A is in a first state 10, in which it has a first temperature T1, a lower process pressure $P_U$ and a first enthalpy $h_1$. In the first state 10, the working medium is present in the liquid phase. A point in the pressure enthalpy diagram (FIG. 1) which corresponds to the first state, is on or in close proximity to the boiling curve $S_L$.

In the pump 3, the working medium A is compressed in an approximately adiabatic manner and converted to a second state 20. The second state 20 is characterized by a second temperature $T_2$, the upper process pressure $p_u$ and the first enthalpy $h_1$. The point in the pressure enthalpy diagram that corresponds to the second state 20, is further away from the boiling curve, that is, the working medium is still present in the liquid phase.

In the heat exchanger 4, heat is supplied to the working medium A in an isobar manner and its enthalpy is thus increased. The working medium, which is first still liquid is thereby first heated to a boiling temperature $T_S$, that is, up to the boiling curve SL. At the boiling point $S_L$ starts a phase conversion from the liquid phase to the gaseous phase. During the course of the flow through the heat exchanger, the gaseous part of the working medium increases, until the working medium is completely vaporized. The pressure $p_o$ and the temperature $T_S$ of the working medium thereby remain constant in the wet steam region, and the heat energy, which is transferred in the heat exchanger from the exhaust gas to the working medium in the wet steam region, mainly effects the phase change from liquid to gaseous. During the further course of the flow-through of the heat exchanger, the working medium A which is now gaseous, is superheated in an isobar manner by a heat transfer from the exhaust gas, until it has taken up a third state 30 at the exit, which is characterized by a third temperature $T_3$, the upper process pressure $p_o$ and a third enthalpy $h_3$.

The working medium A is then expanded in the turbine to the lower process pressure $p_u$, while mechanical energy is generated so that the enthalpy of the working medium is reduced after the expansion. The working medium A is then in a fourth state 40, which is characterized by a fourth temperature $T_4$, the lower process pressure $p_u$ and a fourth enthalpy $h_4$. The expansion thereby takes place according to the invention up to the vicinity of the saturated steam limit $S_G$.

In the condenser, heat energy is withdrawn from the working medium by a heat transfer from the working medium to a cooling medium, whereby the enthalpy of the working medium reduces. If the working medium A in the turbine is not expanded up to the saturated steam limit $S_G$, but into the dry steam region TG, the working medium A that is still gaseous, is first cooled in the condenser by withdrawing a heat amount dQ in an isobar manner from the fourth temperature $T_4$ to the first temperature $T_1$, that is, to the saturated steam limit $S_G$. A phase change from the gaseous phase into the liquid phase starts at the saturated steam limit $S_G$. During the course of the further flow through the of the condenser, the gaseous part of the working medium becomes smaller, until the working medium is completely liquidized. The pressure $p_u$ and the temperature $T_1$ of the working medium thereby remain constant in the wet steam region, and the heat energy which is transferred in the condenser from the working medium to the coolant when "passing through" the wet steam region, mainly effects the phase change from gaseous to liquid. In the condenser, sufficient heat is withdrawn from the working medium so that it is completely condensed at the exit of the heat exchanger and is again present in the first state 10.

From FIG. 1, the influence of an increase of the upper process pressure $p_o$ on the process course will be clear. An increase of $p_o$ to a first increased pressure $p_{o'}$ has the effect that the working medium is expanded to the saturated steam limit in the turbine with the same lower process pressure $p_u$. A further increase to a second increased pressure $p_{o''}$ results in the working medium in the turbine being expanded up to the wet steam region NG, which means that the working medium A partially condenses in the turbine.

The present invention makes it possible to adjust an upper process pressure and a lower process pressure independently of each other by a variation of the delivery performance of the pump and the load of the turbine 5, and furthermore to adapt it to an operating state of the internal combustion engine. The internal combustion engine according to the invention with a heat recovery device permits in particular to vary an upper process pressure $p_o$ in dependence on the operating state and to keep the lower process pressure largely constant thereby. An optimum operation of the heat recovery unit is ensured thereby in a large operating region of the internal combustion engine (partial load, full load). The process pressures can in particular be adjusted in such a manner that the working medium in the turbine is respectively expanded to a saturated steam limit or even slightly into a wet steam region under different operating conditions. During the operation under full load, an upper process pressure of 90 bar or more can be goal-oriented in a thermodynamic manner depending on the working medium used. It is ensured in this manner that respectively a large enthalpy part of the working medium can be transferred to mechanical power under different operating conditions, and the enthalpy part that is discharged as waste heat to the ambient by the condenser is reduced. An increase of the upper process pressure $p_o$ from for example 10 bar to 90 bar leads to a reduction of the cooling heat to be discharged in the condenser by about 10%. Furthermore, the installation space requirement for the condenser is reduced by the expansion up to the wet steam limit, as large cooler surfaces for cooling the hot working medium in the dry steam region can be omitted.

By controlling the lower process pressure $p_u$ furthermore enables that the working medium can be supplied at least approximately in a completely liquid phase to the pump 3 at different operating states. The danger of pump damage due to a working medium supplied in the form of steam is reduced thereby.

The method according to the invention makes it possible in particular to adjust an optimum ratio of the upper and the lower process pressure. To this end, the upper process pressure and/or the lower process pressure are adapted to the respective momentary operating conditions in a large operating region or in the entire operating region so that the ratio between the upper process pressure and the lower process pressure is as large as possible in all operating states. In this manner, a good degree of efficiency of the process can be achieved in the operating region. Assuming that an expansion in the expansion device takes place up to the saturated steam limit or, at most marginally, into the wet steam region, the pressure ratio that can be achieved depends on the temperature and the mass flow of the heat medium (and thus on the heat flow to the working medium) and on the properties of the used working medium (in particular on the boiling point and on the behavior of the working medium in the supercritical region). The pressure ratio is limited by the mechanical load capacity of the components, in particular of the heat exchanger and the expansion device.

The method of the invention is distinguished by a considerably improved degree of efficiency compared to existing methods. The device and the method are in particular suitable for use in a hybrid vehicle, where a motor/generator unit is already present, which can be coupled to the turbine.

What is claimed is:

1. A method for recovering heat dissipated by an internal combustion engine (2) in a recovery circuit including a pump unit (3), a heat exchanger (4), an expansion device (5), a condenser (6) and a first control unit (7) for controlling the pump unit (3) and first temperature and pressure sensors (7.1, 7.2) connected to the first control unit (7) for sensing the temperature and pressure of the working fluid leaving the heat exchanger (4) and a second control unit (8) for controlling a lower process pressure ($p_u$) as well as a second pressure sensor (8.1) for sensing the lower process pressure, said method comprising the following steps:

compressing a liquid working medium (A) from a the lower process pressure ($p_u$) and a first temperature ($T_1$) to an upper process pressure ($p_o$) and a second temperature ($T_2$) in the pump unit (3);

vaporizing the working medium (A) in the heat exchanger (4) by transferring heat from a hot medium containing heat dissipated by the internal combustion engine (2) to the working medium (A), whereby the working medium (A) is heated to a third temperature ($T_3$) while being vaporized during passage through the wet vapor area (NG) of a vapor pressure-enthalpy diagram to a superheat area (TG);

expanding the working medium (A) approximately to the lower process pressure ($p_u$), which is adjustable depending on engine operating conditions so that the working fluid is expanded and its temperature is reduced to a point which is close to a fourth temperature ($T_4$) in the expansion device (5), while generating mechanical energy;

condensing the working medium (A) in the condenser (6) and transferring the working medium (A) to the pump unit (3), adjusting the upper process pressure ($p_o$) by the first control unit (7) in an operating region of the internal combustion engine (2) to such a value that the working medium (A) is expanded in the expansion device (5) approximately to a point close to the saturated vapor limit (S) and adjusting the lower process pressure ($p_u$) by the second control unit in an operating range of the internal combustion engine within a pre-settable pressure range by controlling the load on the expansion device (5).

2. The method according to claim 1, wherein the upper process pressure ($p_o$) is adjusted in dependence on a nominal value for the lower process pressure ($p_u$) and on the superheat temperature ($T_3$) of the working medium (A) downstream of the heat exchanger (4).

3. An internal combustion engine (2) with a heat recovery device (1), comprising:

a pump unit (3) for compressing an at least largely liquid working medium (A) from a lower process pressure ($p_u$) and a first temperature ($T_1$) to an upper process pressure ($p_o$) and a second temperature ($T_2$), a heat exchanger (4) for heating, vaporizing and superheating the working medium (A) at the upper pressure ($p_o$) by heat transfer from a hot medium (M) to the working medium (A), so that the working medium (A) is heated to a superheat temperature ($T_3$), an expansion device (5) for expanding the superheated working medium (A) to the lower process pressure ($p_u$) and to a fourth temperature T4, whereby mechanical power is generated in the expansion device (5), and a condenser (6) for condensing the working medium (A), so that the working medium (A) has approximately the first temperature ($T_1$) after flowing through the condenser (6), the pump unit (3), the heat exchanger (4), the expansion device (5) and the condenser (6) being interconnected in a closed circuit, a temperature sensor (7.1) provided downstream of the first heat exchanger (4) for sensing the superheat temperature ($T_3$) of the medium (A), a pressure sensor (7.2) for sensing the upper process pressure ($p_o$) of the liquid working medium (A), and a first control unit (7) for controlling the upper process pressure ($p_o$) by controlling the pump unit (3) in dependence on an operating state of the internal combustion engine (2), and a second control unit (8) for controlling the lower process pressure ($p_u$) by controlling the expansion load of the expansion device (5) in dependence on the operating state of the internal combustion engine (2) within a pre-settable pressure range.

4. The internal combustion engine (2) according to claim 3, wherein a mass flow of the working medium is adjustable by the first control unit (7) controlling the pump unit (3) in dependence on measuring variables of the sensors for sensing the operating state.

5. The internal combustion engine (2) according to claim 3, wherein the pressure sensor (7.2) is arranged downstream of the first heat exchanger (4).

6. The internal combustion engine (2) according to claim 3, wherein the expansion device (5) is used for controlling the lower process pressure ($p_u$) in dependence on the operating state of the internal combustion engine (2).

7. The internal combustion engine (2) according claim 6, wherein for regulating the lower process pressure ($p_u$) a second control unit (8) is provided, with the help of which a load of the expansion device (5) can be adjusted.

8. The internal combustion engine (2) according to claim 3, wherein the expansion device (5) is one of a turbine and a piston expansion machine.

9. The internal combustion engine (2) according to claim 3, wherein the expansion device (5) is coupled to at least one of a generator, an electrical motor and a motor/generator unit (9).

10. The internal combustion engine (2) according to claim 9, wherein a load of the expansion device (5) is adjustable by means of at least one of the generator, the electric motor and the motor/generator unit (9).

* * * * *